US009106936B2

(12) United States Patent
Wegener

(10) Patent No.: US 9,106,936 B2
(45) Date of Patent: Aug. 11, 2015

(54) RAW FORMAT IMAGE DATA PROCESSING

(75) Inventor: Albert W. Wegener, Aptos Hills, CA (US)

(73) Assignee: Altera Corporation, San Jose, CA (US)

( * ) Notice: Subject to any disclaimer, the term of this patent is extended or adjusted under 35 U.S.C. 154(b) by 467 days.

(21) Appl. No.: 13/358,511

(22) Filed: Jan. 25, 2012

(65) Prior Publication Data
US 2013/0188065 A1 Jul. 25, 2013

(51) Int. Cl.
H04N 21/2381 (2011.01)
H04N 5/232 (2006.01)

(52) U.S. Cl.
CPC ........... *H04N 21/2381* (2013.01); *H04N 5/232* (2013.01)

(58) Field of Classification Search
CPC ..................................... H04N 5/232
USPC ..................................... 348/207.99
See application file for complete search history.

(56) References Cited

U.S. PATENT DOCUMENTS

| 5,172,227 | A | 12/1992 | Tsai et al. | |
|---|---|---|---|---|
| 5,917,542 | A | 6/1999 | Moghadam et al. | |
| 6,008,847 | A | 12/1999 | Bauchspies | |
| 6,031,964 | A | 2/2000 | Anderson | |
| 6,157,740 | A | 12/2000 | Buerkle et al. | |
| 6,256,347 | B1 | 7/2001 | Yu et al. | |
| 6,320,594 | B1 | 11/2001 | Young | |
| 6,442,302 | B2 * | 8/2002 | Klassen | 382/296 |
| 7,009,533 | B1 * | 3/2006 | Wegener | 341/76 |
| 7,088,276 | B1 * | 8/2006 | Wegener | 341/155 |
| 7,088,777 | B2 | 8/2006 | Yu et al. | |
| RE39,712 | E | 7/2007 | Vogel | |
| 7,292,164 | B1 * | 11/2007 | Wegener | 341/76 |
| 7,372,485 | B1 | 5/2008 | Bodnar et al. | |
| 7,554,557 | B2 | 6/2009 | Wu | |
| 7,649,484 | B1 * | 1/2010 | Wegener | 341/155 |
| 7,792,370 | B2 | 9/2010 | Sun | |

(Continued)

FOREIGN PATENT DOCUMENTS

GB 2353452 A 2/2001
JP 2004120529 A 4/2004

(Continued)

OTHER PUBLICATIONS

Xie, X. et al., "A novel method of lossy image compression for digital image sensors with Bayer color filter arrays," IEEE International Symposium on Circuits and Systems, May 2005, vol. 5, pp. 4995-4998.

(Continued)

*Primary Examiner* — Roberto Velez
*Assistant Examiner* — Cynthia Segura
(74) *Attorney, Agent, or Firm* — Okamoto & Benedicto LLP

(57) ABSTRACT

A raw format image representing an image received from an image capture device at an image data rate, can be compressed at least as fast as the image data rate (i.e. in real time) using compact and low cost components. The compressed image data can then be transferred across a chip-to-chip data channel to a memory system or to a host processor where it can be stored as compressed data. The host processor or other processor can read and decompress the compressed raw data and apply digital signal processing including industry-standard data compression or other image processing algorithms to the recovered raw format image without being constrained to real-time processing.

49 Claims, 10 Drawing Sheets

(56) References Cited

U.S. PATENT DOCUMENTS

| | | | |
|---|---|---|---|
| 7,903,306 | B2 | 3/2011 | Cho et al. |
| 7,965,775 | B2 | 6/2011 | Morley et al. |
| 8,116,579 | B2 | 2/2012 | Fenney et al. |
| 2003/0025805 | A1 | 2/2003 | Yamagishi |
| 2004/0012686 | A1* | 1/2004 | Ono et al. ............... 348/211.99 |
| 2004/0013399 | A1* | 1/2004 | Horiguchi et al. ............ 386/46 |
| 2004/0015999 | A1* | 1/2004 | Carlucci et al. ............. 725/136 |
| 2005/0206784 | A1* | 9/2005 | Li et al. ..................... 348/441 |
| 2006/0109339 | A1* | 5/2006 | Chao et al. ............... 348/14.01 |
| 2007/0140554 | A1* | 6/2007 | Strom et al. ................ 382/166 |
| 2007/0223835 | A1* | 9/2007 | Yamada et al. ............. 382/268 |
| 2007/0237391 | A1* | 10/2007 | Wu .............................. 382/166 |
| 2008/0170624 | A1 | 7/2008 | Yamada et al. |
| 2009/0161753 | A1 | 6/2009 | Youn et al. |
| 2009/0169120 | A1 | 7/2009 | Otani |
| 2009/0304073 | A1 | 12/2009 | Usman et al. |
| 2010/0033496 | A1 | 2/2010 | Mancuso |
| 2010/0134636 | A1 | 6/2010 | Cheruel |
| 2010/0142812 | A1 | 6/2010 | Chen |
| 2011/0085602 | A1* | 4/2011 | He ........................... 375/240.25 |
| 2011/0099295 | A1 | 4/2011 | Wegener |
| 2011/0157405 | A1 | 6/2011 | Maeda |
| 2011/0261216 | A1 | 10/2011 | Mori |
| 2014/0321555 | A1* | 10/2014 | Rossato et al. .......... 375/240.26 |

FOREIGN PATENT DOCUMENTS

| | | |
|---|---|---|
| JP | 2009055463 A | 3/2009 |
| JP | 2010-268335 A | 11/2010 |
| KR | 2001076123 | 8/2001 |
| KR | 1020060056558 | 5/2006 |
| KR | 1020060122530 | 11/2006 |
| KR | 1020080024796 | 3/2008 |
| WO | 0002384 A2 | 1/2000 |
| WO | 2006113057 A2 | 10/2006 |

OTHER PUBLICATIONS

Xie, X. et al., "A Low Complexity and High Efficient Method for Image Compression with Bayer CFAs," Tsinghua Science & Technology, vol. 12(1), Feb. 2007, pp. 22-29.

Sung, S. et al., "An LCD driver with on-chip frame buffer and 3 times image compression," Proc. SPIE, vol. 6807, 2008, pp. 68070H-1 to 68070H-6.

Serrano, C., et al., "Segmentation-based lossless compression for color images," Proc. Int'l Conf. on Image Analysis and Processing, 1999, pp. 90-94.

Roterman, Y., et al., "Color image coding using regional correlation of primary colors," Image and Vision Computing, vol. 25(1) 2007, pp. 637-651.

Pan, S-L. et al., "Research on lossless compression of true color RGB image with low time and space complexity," Int'l Conf. on Optical Instruments and Technology, Proc. SPIE vol. 7156, 2008, pp. 715625-1 to 715625-8.

Nallaperumal, K. et al., "New Efficient Image Compression Method for Single Sensor Digital Camera Images," Int'l Conf. on Computational Intelligence and Multimedia Applications, 2007, vol. 3, pp. 113-117.

Lee, SH et al., "Intra Prediction Method Based on the Linear RElationship Between the Channels for YUV 4:2:0 Intra Coding," 16th IEEE International Conference on Image Processing (ICIP), 2009, pp. 1037-1040.

Jin, Y. et al., "A New Frame Memory Compression Algorithm with DPCM and VLC in a 4×4 Block," EURASIP J. on Advances in Signal Processing, vol. 2009:Article 629285, pp. 1-18.

Itoh Y., "Up-sampling of YCbCr4:2:0 image exploiting inter-color correlation in RGB domain," IEEE Transactions on Consumer Electronics, vol. 55(4), 2009, pp. 2204-2210.

Goto, T. et al, "A study on color image coding technique using correlations between color components," IEEJ Transactions on Electronics, Information and Systems, 2004, vol. 124(4) pp. 947-952.

Goffman-Vinopal, L. et al., "Color image compression using inter-color correlation," 2002 Proc. International Conference on Image Processing, vol. 2, pp. II-353 to II-356.

Gershikov, E. et al., "Efficient Color Image Compression Using Demosaicing," 34th Annual IEEE Computer Software and Applications Conference (COMPSAC), Jul. 2010, pp. 244-245.

Doutre, C. et al., "An Efficient Compression Scheme for Colour Filter Array Images Using Estimated Colour Differences," Canadian Conference on Electrical and Computer Engineering, 2007, pp. 24-27.

Doutre, C. et al., "A Fast Demosaicking Method Directly Producing YCbCr 4:2:0 Output," IEEE Transactions on Consumer Electronics, vol. 53(2), 2007, pp. 499-505.

Domanski, M., et al., "A simple technique for near-lossless coding of color images," IEEE International Symposium on Circuits and Systems, 2000, vol. 3, pp. 299-302.

Cinque, L. et al, "A simple lossless compression heuristic for RGB images," Proc. Data Compression Conference, IEEE 2004, p. 533.

Chung, K-L et al., "Efficient chroma subsampling strategy for compressing digital time delay integration mosaic video sequences in H.264/AVC ," J. Electron. Imaging 20(2), 2011, pp. 023011-1 to 023011-15.

Chen, H. et al., "Low-complexity Bayer-pattern video compression using distributed video coding," Proc. Visual Communications and Image Processing, SPIE 2009, pp. 725715-1 to 725715-8.

Chen, H., et al., "Compression of Bayer-Pattern Video Sequences Using Adjusted Chroma Subsampling," IEEE Transactions on Circuits and Systems for Video Technology, 2009, vol. 19(12), pp. 1891-1896.

Chapeau-Blondeau, F., et al., "Fractal structure in the color distribution of natural images," Chaos Solitons Fractals, Elsevier Ltd. vol. 42(1), 2009, pp. 472-482.

PCT Search Report and Written Opinion mailed Apr. 19, 2013 in PCT/US2012/071382, 16 pages.

H.264/MPEG-4 AVC, Definition from Wikipedia, downloaded on Dec. 29, 2011, 12 pages.

JPEG, definition from Wikipedia, downloaded on Dec. 29, 2011, 22 pages.

Lim, Sukhwan et al., "Integration of Image Capture and Processing—Beyond Single Chip Digital Camera," Proceedings of the SPIE Electronic Imaging '2001 conference, vol. 4306, San Jose, CA, Jan. 2001, 8 pages.

Omnivision, OV3642 3 megapixel product brief, v. 1.1, Sep. 2008, 2 pages.

Omnivision, OV3660 3-megapixel product brief, v. 1.2, Feb. 2011, 2 pages.

Omnivision, OV5640 5-megapixel product brief, v. 1.2, Feb. 2011, 2 pages.

YCbCr, definition from Wikipedia, downloaded on Dec. 20, 2011, 5 pages.

YUV, definition from Wikipedia, downloaded on Dec. 20, 2011, 8 pages.

* cited by examiner

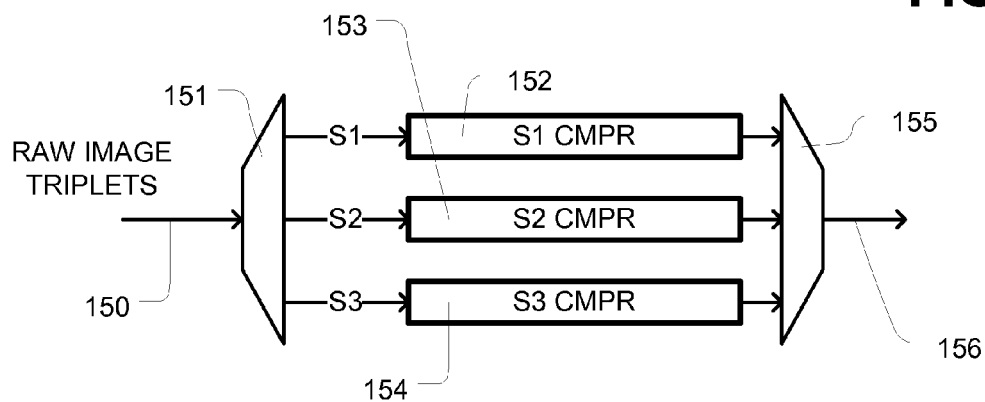
FIG. 5
FIG. 6
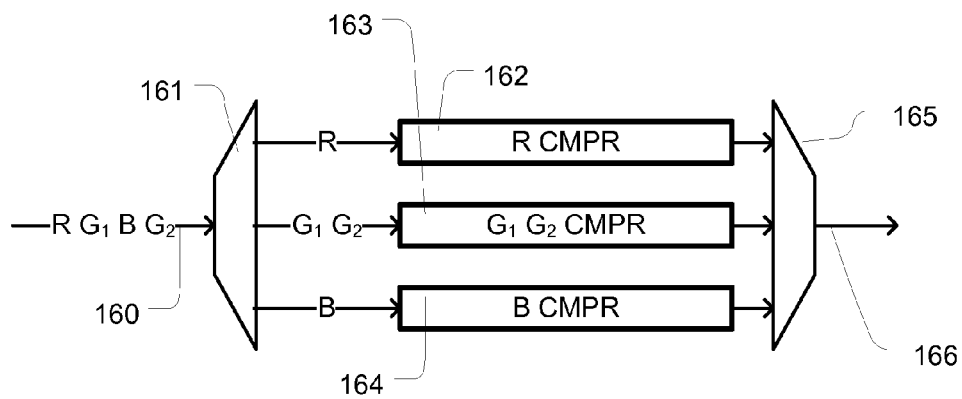
FIG. 7

| Exps per Token | Encoding technique | Exp diff(s) {diff(i), diff(i-1)} or Absolute exp(i) | Exponent Token (hex) | Token Length (# bits) | Bits per Exp |
|---|---|---|---|---|---|
| (A) | | | | | |
| 2 | DIFF (2 EXPS) | {-1, -1} | 0x0 | 4 | 2 |
| 2 | DIFF (2 EXPS) | { 0, -1} | 0x1 | 4 | 2 |
| 2 | DIFF (2 EXPS) | {+1, -1} | 0x2 | 4 | 2 |
| 2 | DIFF (2 EXPS) | {-1, 0} | 0x3 | 4 | 2 |
| 2 | DIFF (2 EXPS) | { 0, 0} | 0x4 | 4 | 2 |
| 2 | DIFF (2 EXPS) | {+1, 0} | 0x5 | 4 | 2 |
| 2 | DIFF (2 EXPS) | {-1, +1} | 0x6 | 4 | 2 |
| 2 | DIFF (2 EXPS) | { 0, +1} | 0x7 | 4 | 2 |
| 2 | DIFF (2 EXPS) | {+1, +1} | 0x8 | 4 | 2 |
| (B) | | | | | |
| 1 | DIFF (1 EXP) | -2 | 0x9 | 4 | 4 |
| 1 | DIFF (1 EXP) | -1 | 0xA | 4 | 4 |
| 1 | DIFF (1 EXP) | 0 | 0xB | 4 | 4 |
| 1 | DIFF (1 EXP) | +1 | 0xC | 4 | 4 |
| 1 | DIFF (1 EXP) | +2 | 0xD | 4 | 4 |
| (C) | | | | | |
| 1 | ABS (1 EXP) | {0, 2, 3, ... 32} | 111aaaaa | 8 | 8 |

FIG. 13

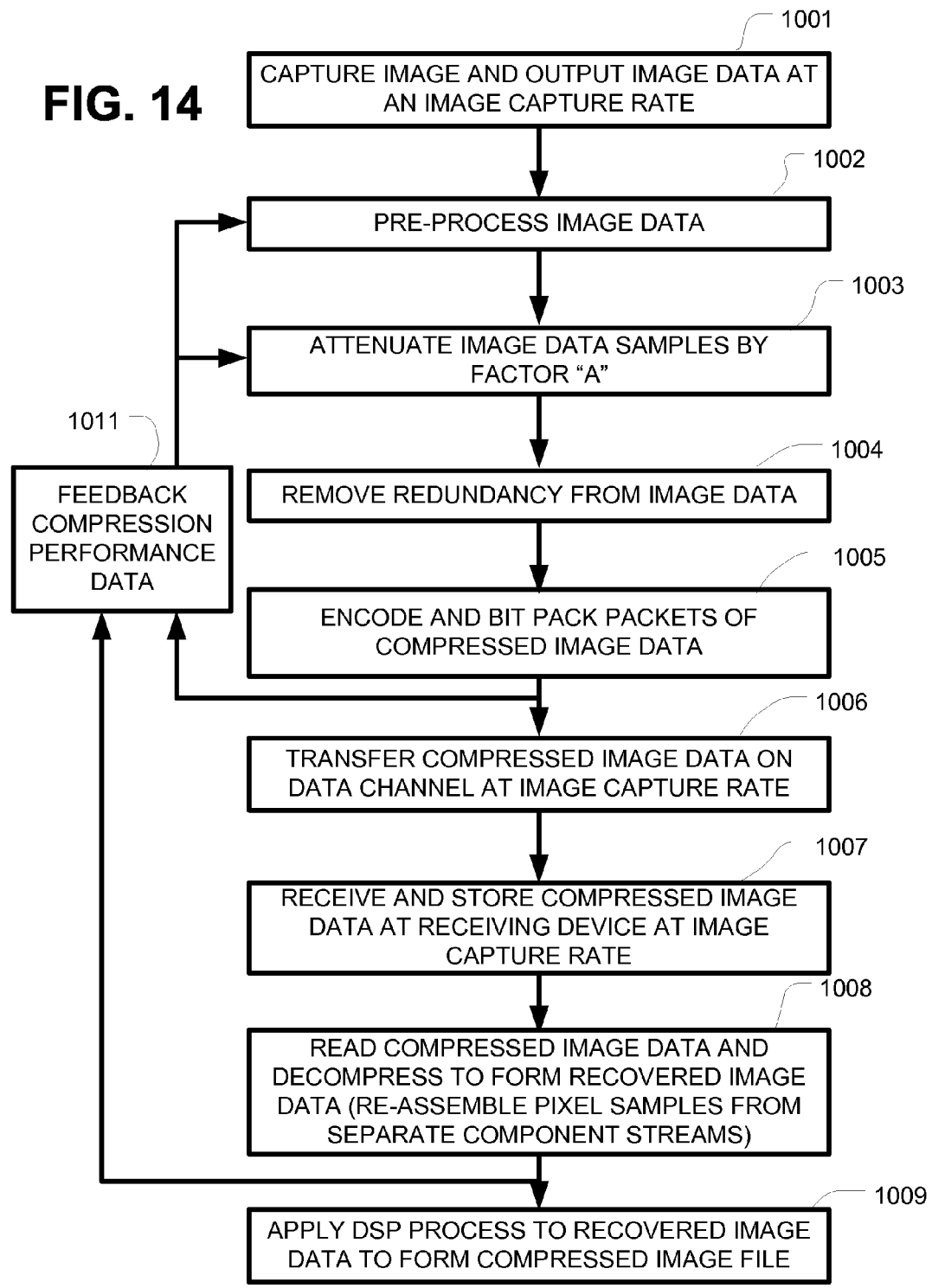

RAW FORMAT IMAGE DATA PROCESSING

FIELD

The present invention relates to data processing systems and imaging systems which process raw pixel information or other large image files.

BACKGROUND

Digital cameras and scanners include sensors which produce image data in a raw format. The raw format produced can vary from device to device. Basically, the raw format produced by an imaging device comprises pixel data arranged in a two-dimensional array for still images, and a sequence of such arrays for video. The pixel data characterizes each pixel using multispectral coding according to components of a color space that contribute to the sensed color or spectrum of each pixel. One common color space often applied in imaging devices, such as cameras and scanners, is known as the red/green/blue (RGB) space. Multispectral coding can also include data that relates to wavelengths of light that are outside the visible range, such as infrared or ultraviolet spectra.

Image capture devices can include sensors that are configured to sense each of the components of the multispectral coding for each pixel. For example, in an RGB space, a camera can include sensor arrays for each of the red, green and blue components of the color. Such sensor arrays can comprise so-called CMOS sensors or CCD sensors with corresponding filters that select the color, or spectrum, component to be detected by the sensors.

Also, a "mosaic" filter can be used with a single sensor array, so that each sensor in the array is arranged to detect a specific component of the multispectral coding. Postprocessing can be utilized to interpolate the data in order to provide all components for each pixel. Alternatively, each pixel could be characterized by a set of sensors in the array that provides data for each component.

A common type of mosaic filter used for visible imaging is known as the Bayer filter. The Bayer filter has a mosaic pattern in which, for example, every 2-by-2 set of sensors includes two green and one each of red and blue filters. This pattern takes advantage of the fact that human vision is more sensitive to green than the other components of the RGB color space. A process of interpolating the raw image data which has been gathered using a Bayer filter takes into account this characteristic when producing the final raw image data. This interpolation process is sometimes called demosaicing.

Imaging devices are configured to capture images of high resolution at a high rate of speed. Each captured image in high resolution includes a large number of pixels. Typically, the data from the sensors is read out of the array in a raster scan or row-by-row format that is transferred in serial fashion to a host processing system that can perform further digital signal processing on the raw data. The rate of image capture (e.g. frames per second) multiplied by the number of pixels per image, plus overhead data associated with each image, determines an image data rate at which the host processing system should be arranged to accept image data input.

Raw format image data are usually processed into formats according to industry standards, such as JPEG, which, among other functions, involves compressing the data. Other digital signal processes can be applied as well, including white balance processing, contrast processing, changing of the size or aspect ratio of the image, and so on. When the data are stored or transmitted for use by consumers, they are typically provided in the standard compressed file formats such as .tif or .jpg.

The process for converting the raw format data into one of the industry-standard formats, and other digital signal processing for the images, can be relatively slow compared to the rate at which the data are captured by the cameras or scanners.

As the resolution, or number of pixels per image, increases, the size of these raw format images is becoming very large. Also, as the technology for image sensors improves, the rate at which these raw format images are captured is increasing. Resources are required to move and store these large raw format images in a manner that accommodates the image capture rate. Thus, large high-speed buffers and multiple high-bandwidth data channels can be required to keep up with the imaging devices. These resources consume power during operation, reducing the battery life of portable imaging devices. Also, these resources increase the component costs for image processing systems.

Thus, transferring and storing raw format images in preparation for or during further digital signal processing of the images is becoming resource-intensive, increasing the power consumption and driving up the costs.

It is therefore desirable to provide a technology that reduces the resources required and reduces the time required to perform raw image data capture, and raw image data processing.

SUMMARY

A technology is described for receiving image data including a plurality of pixels representing gray scale or multispectral coding, and compressing the image data. The image data can be produced by an image capture device at the image data rate, and the compressing process can be accomplished at least as fast as an image capture time window (i.e. in real time) using compact and low-cost components. The compressed image data can then be transferred across a data channel at least as fast as the image data rate from an integrated circuit that includes or is coupled with an image sensor, to an integrated circuit memory or an integrated circuit image processor where it can be stored as compressed raw data. The image processor can read and decompress the compressed raw data off-line, and apply digital signal processing, including for example industry-standard data compression or other image processing algorithms, to the recovered image data without being constrained to real-time processing. Without compromising the image data rate, the size of the memory storing the raw format images and/or the bandwidth of the data channel used to transfer the raw format images can be reduced, saving cost and power in the imaging system. The compression logic can apply time domain compression processes, in order to maintain high throughput required to perform as fast as some image capture devices.

A representative system includes an image capture component which produces the raw format images, and an image processor which applies digital signal processing algorithms to the images. A memory typically coupled to the image processor is used to store the raw format images for off-line processing by the image processor. Compression logic can be included in the image capture component, reducing the bandwidth requirements for the data channel between the image capture component and the image processor, reducing the bandwidth requirements for the data channel between the image processor and the memory, and reducing the size and/or bandwidth requirements of the memory. Alternatively, compression logic can be included in the image processor, where the image processor receives the raw format images from the image capture device, and compresses it for transfer to the memory. In this embodiment, the bandwidth requirements for the data channel between the image processor and the memory, and size requirements for the memory, are reduced.

The compression logic can be dynamically controlled in order to maintain a fixed data rate on the communication channels, in order to maintain image quality for the recovered data, and using data rate and recovered image quality parameters as needed for a particular application of the technology.

In embodiments that include an image capture device that applies a Bayer matrix or other mosaicing process, the compression logic can be configured to take advantage of the characteristics of the raw data that arise from the mosaicing to improve performance or reduce costs. In some embodiments, the compression logic can be configurable in response to parameters stored in configuration registers, or other types of user input, in order to perform compression operations that are matched to a specific image capture environment, including one-dimensional compression (i.e. using comparisons between pixels on a single row), two-dimensional compression (i.e. using comparisons between pixels in different rows), and three-dimensional compression (i.e. using comparisons between pixels in different frames).

Technologies are described where the raw format images includes interleaved multispectral coding, which includes classifying the multispectral data and applying sample sequences from each component to a separate compression channel. The outputs of the multiple compression channels can be combined into a single data sequence, or maintained separately for transfer to the host processor. In some embodiments, time domain compression techniques can be optimized for each component.

Other aspects and advantages of the technology described herein can be understood from the detailed description and figures set out below.

BRIEF DESCRIPTION OF THE FIGURES

FIG. 5 is a simplified diagram of compression logic applied for raw format images that classifies image data components according to a format of the multispectral coding.

FIG. 6 illustrates an arrangement of a Bayer matrix which can be applied in image capture systems.

FIG. 7 is a simplified diagram of compression logic applied to raw format images that classifies image data components that comprise Bayer matrix mosaic coding.

FIG. 13 is a table of an encoding scheme that uses four or eight bits for an exponent token.

FIG. 14 is a simplified flowchart of an image capture process that includes raw format image compression as described herein.

DETAILED DESCRIPTION

Figure 1:
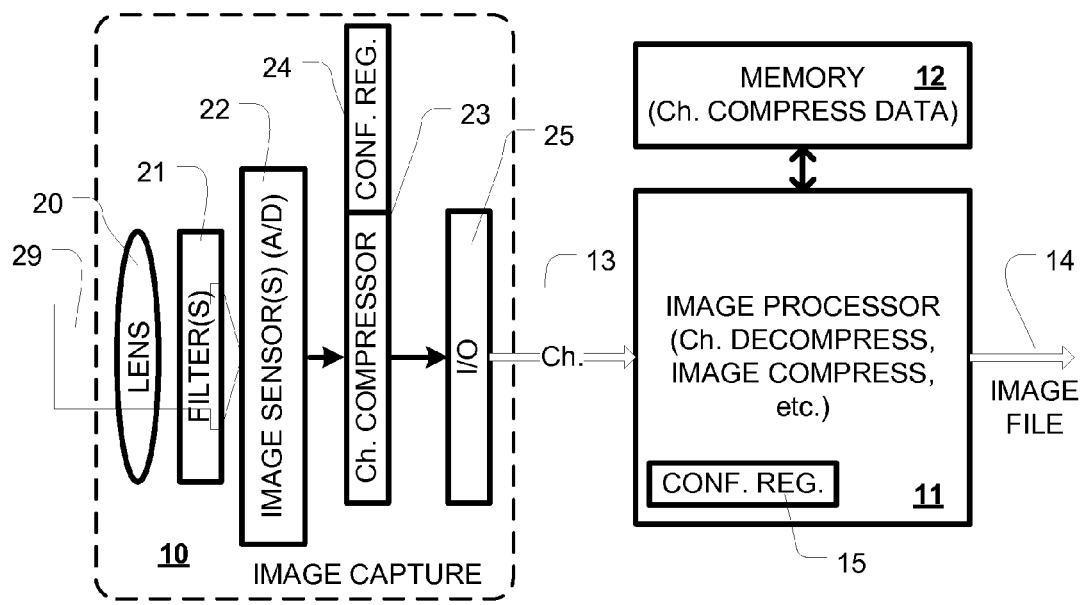
FIG. 1 is a simplified block diagram of an image capture system including compression logic as described herein.

A detailed description of image capture technology is described with reference to FIGS. 1-11. Embodiments of the technology described here include receiving a raw format image from an image capture device at an image data rate, where the raw format image includes a plurality of pixel samples that represent gray scale or multispectral coding of an image. This embodiment of the method includes compressing the raw image data to form a compressed raw format image at least as fast as the image data rate, and completing compression of an image frame in a time less than the image capture time window, and then transferring the compressed raw format image across a data channel between integrated circuits. A raw format image and a compressed raw format image as used herein comprise data structures that include the plurality of pixel samples organized in a manner that can be stored, transmitted and processed in a data processing system. In some embodiments, raw format images on the order of 100 Megapixels can be compressed at least as fast as the image data rate. Also, image capture systems that work on the order of 200 or more images (or frames) captured per second, can be compressed at least as fast as the image data rate, and produce a compressed raw format image for the image captured in each frame within a time less than the image capture time window. The image capture time window in a system capturing 200 frames per second is 5 milliseconds. Embodiments described here perform compression of the raw format images within the image capture time window, so that compression processing is at least as fast as the image capture data rate, and can usually achieve at least 2-to-1 compression. The compression can be accomplished using only time domain compression processes. Spatial domain data at the sensors are translated to time domain data as it is scanned out through the analog to digital converters.

Later, the compressed raw format images are decompressed to form recovered raw image data. Then further digital signal processing of the recovered raw image data can be performed, including translating the recovered raw image data into an industry-standard and compressed format, like JPEG or H.264 using transform domain compression processes. In various embodiments, the receiving component can be a memory which is used to store the compressed raw format image for access and processing later by a host processing system. In other embodiments, the receiving component can be one integrated circuit which passes the compressed raw format image through to a memory on another integrated circuit, and then later reads the compressed raw format image from the memory for further processing.

Methods like these embodiments accommodate very fast image capture rates while allowing digital signal processing of recovered raw image data to be executed off-line (i.e. without interfering with the flow of raw format images from image capture device to memory or other destinations). Also, the later digital signal processing of the recovered raw image data can involve more resource-intensive processing which produces results at a rate slower than the image data rate.

FIG. 1 illustrates an image capture system. The image capture system includes an image capture device 10, which can comprise a first integrated circuit that includes or is coupled to an image sensor, and an image processor 11 which can comprise a second integrated circuit that is arranged to receive image files from the image capture device 10 across a first data channel 13 and to perform further processing. The image processor 11 is coupled to memory 12, which can comprise a third integrated circuit such as a high-speed dynamic access memory DRAM device. Also, in this illustrated system, the image processor 11 includes an interface to a second data channel 14 for communication with other devices or memory systems that can receive the results of the image processing performed. The data channel 13 can consist of one or more lanes of gigabit SERDES channels, or other protocols adapted for chip-to-chip communications. The integrated circuits include logic to perform the processes described herein, where the logic can include dedicated logic circuits, configurable logic such as field programmable logic array FPGA blocks, configured to perform the functions, general purpose processors or digital signal processors that are programmed to perform the functions, and various combinations thereof.

In this example, the image capture device 10 includes components often found in a camera. Thus, a lens 20 and a filter or filters 21 are arranged to gather light (29) from a field of view, and to focus the light on an image sensor or sensors 22. The image sensor(s) 22 typically include respective arrays of detectors and one or more analog-to-digital converters, which are together arranged to output raw image data in a raster scan or other two-dimensional pattern. In some systems, the image sensor(s) 22 may also perform some basic processing functions (not shown). For example, the raw image data are typically packaged within data structures that are compatible with the system. Also, in some image capture devices basic color space adjustments or conversion can be executed so that the outgoing raw image data are compatible with a particular color space such as RGB, YUV, YCrCb, and so on.

Conversions from an image sensor space to RGB (if needed), or from RGB or the image sensor space, to other color spaces such as YUV and YCrCb, can be done in-line using fast processors. See, "YCrCb," from Wikipedia, the free encyclopedia, downloaded Dec. 20, 2011 (included in Information Disclosure Submission filed herewith); and "YUV," from Wikipedia, the free encyclopedia, downloaded Dec. 20, 2011 (included in Information Disclosure Submission filed herewith). Also, color space decimation such as the 4:2:2 decimation or 4:2:0 decimation as applied for YUV or other luminance:chrominance space can be applied in-line. The converted image data or decimated image data, when the conversion or decimation is applied in-line, produces raw image data for the purposes of this description. For real-time image acquisition systems, the raw format image represents an image that includes an array of pixel samples. The raw format image is output from a sensor array during an image capture time window. The image capture time window is long enough for the image to be captured in the sensor array, digitally sampled, with any in-line processing to be applied, and transmitted out of the sensor array, allowing a next raw format image to be captured. This image capture time window is typically specified according to the specific device. The image capture data rate is the rate at which the samples in the raw format image are delivered, that is the number of bits per unit time (e.g., the size of the raw format image in bits, divided by the length of the image capture time window in seconds).

In some embodiments, the just described conversions and decimation processes can be applied to the recovered raw format images after compression and later decompression.

For one example, a raw format image representing RGB-encoded pixels can be configured into triplets of selected sizes, such as a 24 bit triplet where each color component is represented by eight bits. The data structure can also include features that indicate the beginning and end of each row, and the beginning and end of each frame. In the embodiment shown in FIG. 1, the raw format image from the image sensor(s) 22 (after possible in-line processing) is delivered to a channel compressor 23. A configuration register 24 can be associated with the channel compressor 23 as described in more detail below.

The output of the channel compressor 23 can comprise a sequence of packets of compressed raw format images which are transferred to input/output transceivers 25 adapted for a parallel or serial data channel, and across the data channel 13 to the image processor 11. The channel compressor 23 can be configured to perform compression, such as time domain compression, at least as fast as the image data rate, which is at least as fast as the raw image data are received from the image sensor(s) 22. In these embodiments, the channel compressor can be implemented with relatively small logic circuits and will not require large buffering capability. Also, the channel compressor 23, operating at least as fast as the raw image data are received, will not suffer from overflow as the image sensor(s) produce data from rapid sequences of images. Also, the compressed raw format image can be transferred across the data channel within the image capture time window. Because the compressed raw format image is smaller than the captured raw format image, it can be transferred using a slower speed physical link, or a smaller number of parallel physical links, than would be required to transfer the captured raw format image, and still complete the transfer within the image capture time window.

In some embodiments, the image sensor(s) 22, channel compressor 23 and input/output transceivers are components of a single integrated circuit. The channel compressor can comprise an implementation of a pre-defined circuit design from a design library, or an IP block, added to image sensor integrated circuits during design, that is small, low power and fast. The IP block can also be configurable to accommodate features of the data structure carrying the raw format image and design goals of the user.

The image processor 11 receives the compressed raw format image from the data channel 13 and transfers it to memory 12, where the compressed data from the channel can be stored for later off-line processing.

The image processor 11 includes resources for decompressing the channel data ("Ch. DECOMPRESS"), as well as resources to perform further digital signal processing, such as image compression according to other compression algorithms, or other image manipulation processes. As illustrated in FIG. 1, a configuration register 15 can be included in the image processor 11 that is complementary to the configuration register 24 on the image capture device 10. After such further processing, a processed image can be transferred on the data channel 14 to a long-term storage device, or other processing resources.

The image processor 11 can be part of one integrated circuit that includes input/output transceivers for the data channel, while the input/output transceivers 25 are part of a different integrated circuit. In this configuration, the load on the data channel 13 associated with raw format image is much reduced, allowing implementations of the data channel using fewer parallel or serial physical links, or operation of the data channel at slower speeds and at lower powers.

Figure 2:
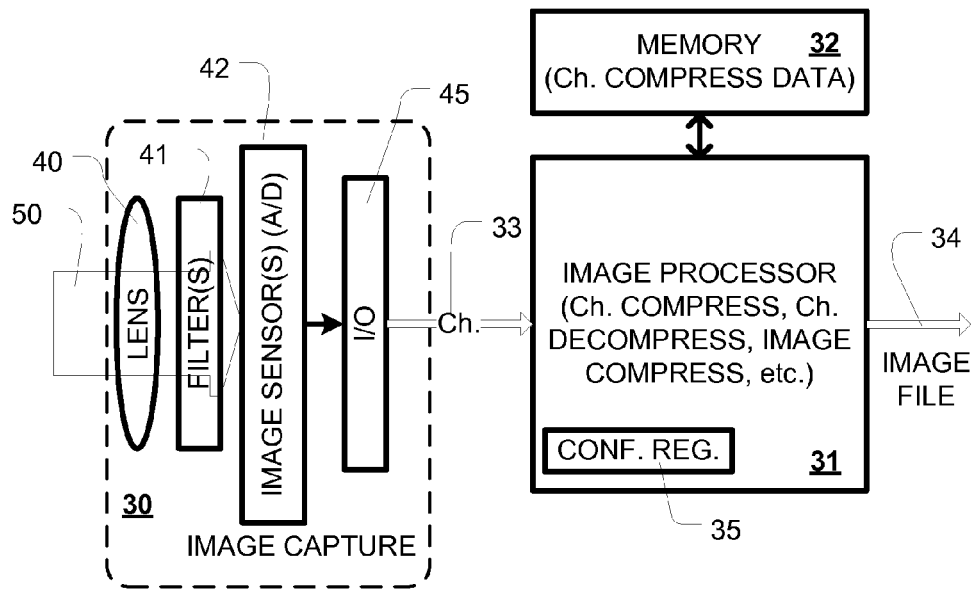
FIG. 2 is a simplified diagram of an alternative implementation of an image capture system including compression logic as described herein.

FIG. 2 illustrates an alternative image capture system. The image capture system includes an image capture device 30 and an image processor 31 or other host processor that is arranged to receive a raw format image from the image capture device 30 across a first data channel 33 and perform further processing. The image processor 31 is coupled to memory 32, such as a high-speed dynamic access memory DRAM device. Also in this illustrated system, the image processor 31 includes an interface to a second data channel 34 for communication with other devices or memory systems that can receive the results of the image processing performed.

In this example, the image capture device 30 includes components like a camera. Thus, a lens 40 and a filter or filters 41 are arranged to gather light (50) from a field of view, and focus the light on an image sensor or sensors 42. The image sensor(s) 42 typically include respective arrays of detectors and one or more analog-to-digital converters, which are together arranged to output raw image data in a raster scan or other two-dimensional pattern. In some systems, the image sensor(s) 42 may also perform some basic processing functions. For example, the raw image data are typically packaged within data structures that are compatible with the system. Also, in some image capture devices basic color space adjustments or conversion can be executed so that the outgoing raw image data are compatible with a particular color space such as RGB, YUV, YCrCb, and so on. Conversions from an image sensor space to RGB (if needed), or from RGB or the image sensor space, to other color spaces such as YUV and YCrCb, can be done in-line using fast processors. For example, color space conversion processes can be executed on a per-pixel basis using a 3×3 matrix multiply. Also, color space decimation such as the 4:2:2 decimation or 4:2:0 decimation as applied for YUV or other luminance:chrominance space can be applied in-line. Decimation can be implemented using simple averaging. See, "YCrCb," From Wikipedia, the free encyclopedia, downloaded Dec. 20, 2011 (included in Information Disclosure Submission filed herewith); and "YUV," From Wikipedia, the free encyclopedia, downloaded Dec. 20, 2011 (included in Information Disclosure Submission filed herewith). In the embodiment shown in FIG. 2, the raw format image from the image sensor(s) 22 is delivered to input/output structures 45 and across the data channel 33 to the image processor 31.

The image processor 31 receives the raw image data from the channel 33 and applies a channel compression function ("Ch. COMPRESS"). The channel compression function can be configured to perform compression at least as fast as the image data rate at the image processor 31, which is at least as fast as the raw image data are received from the channel 33. In these embodiments, the channel compressor can be implemented with relatively small logic circuits, or compact computer programs, and will not require large buffering capability. Also, a channel compressor operating at least as fast as the raw image data are received will not suffer from overflow as the image sensor(s) produce data from rapid sequences of images. The image processor 31 transfers the compressed raw format image to memory 32 within an image capture time window, where the compressed data from the channel can be stored for later off-line processing. Thus, the image processor 31 includes resources for decompressing the channel data ("Ch. DECOMPRESS"), as well as resources to perform further digital signal processing, such as image compression according to other compression algorithms, or other image manipulation processes. As illustrated in FIG. 2, a configuration register 35 can be included in the image processor 31 used for configuring the channel compression function. After such further processing, a processed image file can be transferred on the data channel 34 to a long-term storage device, or other processing resources.

Figure 3:
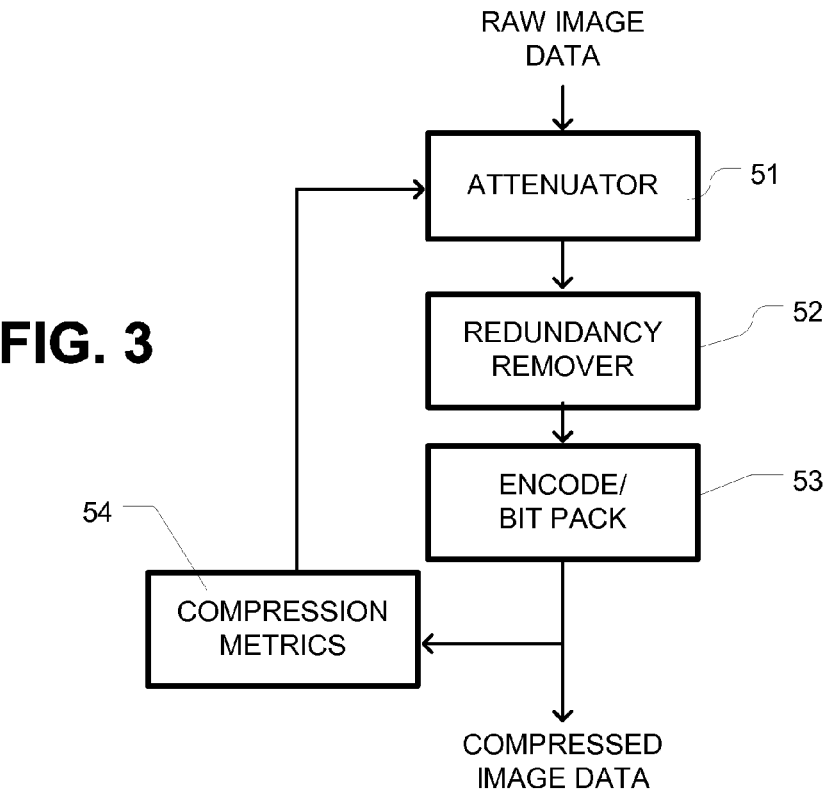
FIG. 3 is a block diagram of compression logic suitable for use in image capture systems as described herein.

FIG. 3 illustrates the basic components of compression logic that can be used for the channel compression function described herein. Raw image data are received at an attenuator 51 which can be used to remove integer or fractional least significant bits from the signal samples to reduce the bit count. For example, when attenuator 51 is set to a value of 0.5, one least significant bit is removed from each sample. In contrast, when attenuator 51 is set to a value of 0.4, one least significant bit plus a fractional amount of the second-least significant bit is removed from each sample. For raw image data delivered in triplets or other formats that involve components for a plurality of color spectra, the attenuator 51 can be configured to apply a distinct attenuation to each component of the triplet or to apply the same attenuation to all of the components of the triplet. Also, as mentioned in more detail below, raw image data in triplet format can be demultiplexed before being applied to a compression engine. The output of the attenuator 51 is applied to a redundancy remover 52 which can reduce the dynamic range encoded by the raw image samples using first, second or higher-order derivatives for example. The output of the redundancy remover 52 is applied to bit packer logic 53 which packs the bits into a format for communication as a compressed raw format image to decompression logic, which can be located at the receiving end of a data channel. Representative implementations of compression logic are found in commonly owned U.S. Pat. No. 7,009,533, entitled ADAPTIVE COMPRESSION AND DECOMPRESSION OF BANDLIMITED SIGNALS invented by Albert W. Wegener, which is incorporated by reference, as if fully set forth herein.

The compression logic illustrated in FIG. 3 includes a feedback loop based on compression metrics logic 54 that measures characteristics of the compressed raw format image that reflect on performance of the compression logic. The compression metrics logic 54 can also include a configuration register (not shown) in order to configure the compression logic. The configuration register may provide for selection of a compression mode, selected from among lossless, fixed rate, or fixed quality compression modes. In the illustrated example, the compression metrics logic 54 provides feedback to the attenuator 51 based for example on the number of bits per sequence, such as the number of bits per packet, the number of bits per row or the number of bits per frame of an image, in the compressed raw format image. For example, the packet length may be set to 256 samples, to correspond to 256 pixels per color plane in the H.264 image compression standard. When the compression logic is configured to maintain a constant bit rate, or a bit rate within a target range, the compression metrics logic 54 adjusts the attenuation factor applied by the attenuator 51 in order to maintain that bit rate. When the compression logic is configured for lossless compression, the compression metrics logic 54 can disable the attenuator 51, or set the applied attenuation factor to 1.0.

Figure 4:
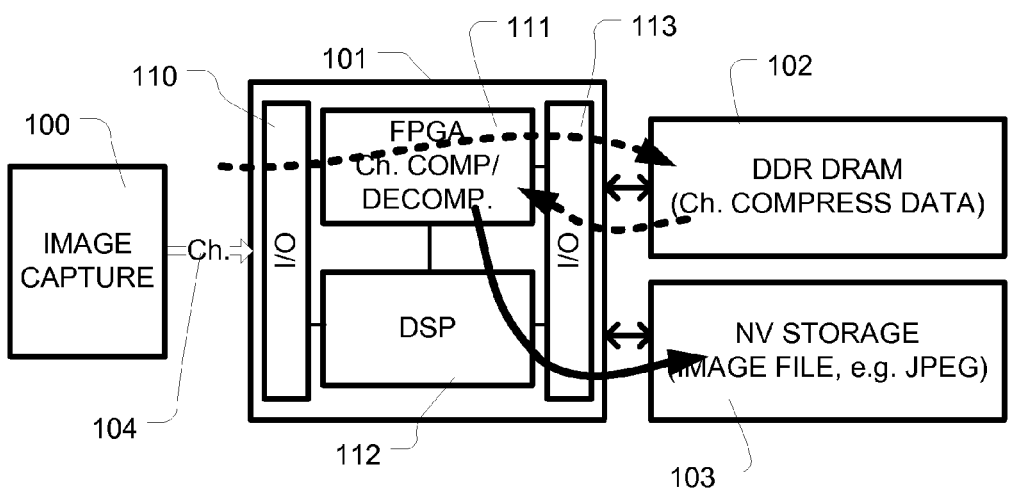
FIG. 4 is a simplified block diagram illustrating one embodiment of an image capture system including compression logic.

FIG. 4 illustrates one embodiment for implementation of an image capture system that includes compression logic for the data channel between the image capture device and the host processor. In this example, the system includes an image capture device 100, which can be like those described above with reference to FIGS. 1 and 2. A host processor 101 is coupled to the image capture device 100 by a data channel 104. The host processor 101 is coupled to a high-speed memory 102, such as a double-data-rate, dynamic random access memory DDR DRAM. Also, the host processor 101 is coupled to nonvolatile storage 103, such as a magnetic disk, a flash storage device, or other storage system.

The host processor 101 in the embodiment shown in FIG. 4 includes an input/output port 110 (including parallel or serial physical layer transceivers) that is coupled to the data channel 104, and an input/output port 113 (or ports) coupled to the memory devices, including high-speed memory 102 and nonvolatile storage 103. High-speed memory 102 and nonvolatile storage 103 may have separate ports within input/output port 113. The host processor 101 includes the digital signal processor (DSP) core 112 along with channel compression and decompression logic 111. The channel compression and decompression logic 111 is implemented using for example field programmable gate array (FPGA) technology which can be on the same integrated circuit as the DSP core 112. DSP core 112 could be replaced by a graphics processor unit, a central processor unit, a single core or multicore processor configuration, an application-specific integrated circuit (ASIC), or other data processing architectures that suit a particular image capture application. It can be desirable to place channel compression and decompression logic 111 in independent logic, like the FPGA embodiment described here, to reduce processing overhead, to increase the speed, and to reduce the cost of implementation. Also, the channel compression and decompression logic 111 can comprise an implementation of a pre-defined circuit design from a design library, or an IP block, added to the image processor integrated circuit during design, that is small, low power and fast. Also the IP block and the FPGA embodiments can be configurable to accommodate features of the data structure carrying the raw format image, and design goals of the user.

In other embodiments, the channel compression and decompression logic 111 might be performed by the DSP core, rather than in an independent logic block, particularly in multicore embodiments or other embodiments that accommodate parallel processing. For example, a subset of cores in a multicore embodiment may be dedicated to perform the channel compression and/or decompression functions.

In the example illustrated by FIG. 4, raw image data are received from the channel 104 in the channel compression and decompression logic 111 and delivered to the high-speed memory 102, at least as fast as the data are received from the channel 104. This limits the size requirement for the high-speed memory 102, as this memory acts as a buffer for storage of the compressed raw format image for later processing. When further processing of the raw image data is desired, the compressed raw format image is read from the high-speed memory 102 through the compression and decompression logic 111. The decompressed or recovered raw image data are then delivered to the DSP core 112, where further digital signal processing functions are executed. The processed image data can then be delivered to nonvolatile storage 103 after compression according to more complex compression processes, or after other image manipulation processes.

The example illustrated by FIG. 4 has the basic architecture shown in FIG. 2, with the channel compression logic on the image processor. In other examples, channel compression logic can be implemented on the image capture device 100 as discussed above with reference to FIG. 1. In such embodiment, the channel compression logic can also be implemented in FPGA function blocks, or other types of dedicated logic for high-speed, and low-cost operation. In other embodiments, a general-purpose processor can be applied to perform this function on the image capture device.

FIG. 5 illustrates a configuration for channel compression logic which can be used in systems as described herein. In the configuration shown in FIG. 5, raw image data are delivered in triplets on line 150 to demultiplexer 151. For example, a triplet can include a sample from a first spectral component S1, a sample from a second spectral component S2, and a sample from a third spectral component S3. These spectral components can be produced by independent sensors, and may correspond to red, green and blue, or to the spectral components that are effectively sensed by the technology applied in the system. It is noted that the spectral components can include elements outside the visible range, including components in the infrared or ultraviolet ranges, in some embodiments. The demultiplexer classifies the components of the triplets and delivers three separate streams, one for each classification, to corresponding compression logic 152, 153, 154. The classified streams S1, S2, and S3 may operate at identical rates, such as for RGB encoding, or at different rates, such as when color space decimation is performed. Examples of color space decimation include 4:2:2, 4:2:0, and others, where luminance (brightness) components are typically encoded at higher bit rates than chrominance (color) components. The output of the compression logic 152 for the S1 component, the output of the compression logic 153 for the S2 component and the output of the compression logic 154 for the S3 component are provided to multiplexer 155 in this example. The multiplexer 155 interleaves the compressed data for delivery on a common data channel 156. In other embodiments, the multiplexer 155 can be omitted where there are sufficient data channels available to handle the three separate streams of compressed data.

FIG. 6 illustrates a Bayer matrix. A Bayer matrix is a configuration of a mosaic filter which can be used to sense color components with a single array of detectors. As can be seen, the Bayer matrix includes filters, which can correspond one-to-one with image detectors on the detector array or example. Of course, the correspondence can be other than one-to-one. The Bayer matrix pattern includes odd rows of alternating red and green filters, and even rows of alternating green and blue filters. In this way, every 2×2 set of filters includes two green filters, and one each of red and blue filters. The Bayer matrix mosaic filter configuration has been shown to provide excellent results for visible imaging and is in widespread use. Other mosaic filter configurations can be applied in imaging systems as well. The data that result from a "mosaicing" process using a Bayer matrix can be delivered in "quads" (R G1 B G2), where each quad includes a value sensed through a red filter, a value sensed through a first green filter, a value sensed through a blue filter, and a value sensed through a second green filter. In the configuration shown in FIG. 7, raw image data are delivered in quads on line 160 to demultiplexer 161. The demultiplexer 161 classifies the components of the quads into three separate streams, one for the red components, one for the green components, and one for the blue components. As illustrated, for a Bayer matrix quad, the green component stream will have twice as many samples as the red and blue. Each of the independent streams is applied to a compression logic configured for that stream. Thus, compression logic 162 is adapted for the red component. Compression logic 163 is adapted for the green component. Compression logic 164 is adapted for the blue component. The outputs of the compression logic 162-164 can be applied to the demultiplexer 165 which interleaves the compressed data streams onto a data channel 166. As mentioned above, in alternative systems, the outputs can be delivered on separate data channels given available resources.

Figure 8:
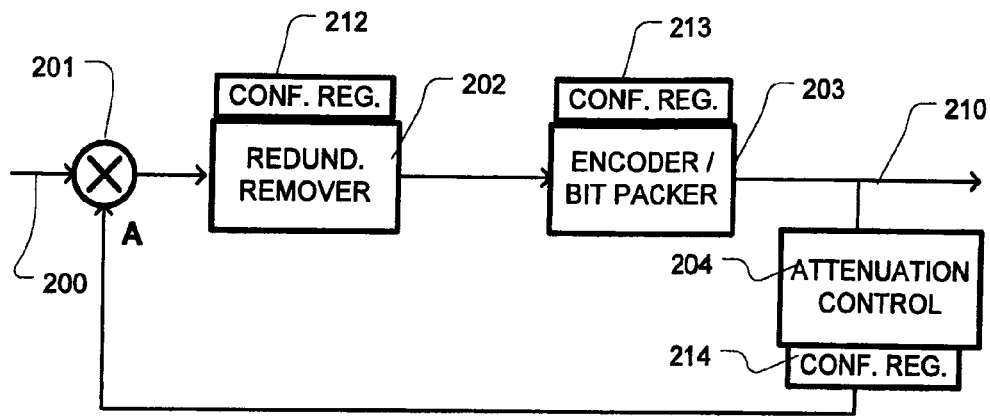
FIG. 8 illustrates one logical arrangement for configurable compression logic suitable for use in systems as described herein.

FIG. 8 provides a block diagram of another embodiment of compression logic which can be used herein, in which the compression logic is configurable using configuration registers that can be set by a user or designer to match the needs of a particular system. In this embodiment, the input data stream is delivered on line 200 to an attenuator 201, which multiplies each sample by an attenuation factor A. The output of the attenuator 201 is applied to the redundancy remover 202. The output of the redundancy remover 202 is applied to a bit packer 203 which assembles the compressed data into data structures or packets for transmission on the data channel, and is usable by the decompression logic. The output of the bit packer 203 is applied on the line 210 to input/output circuitry. Attenuation control logic 204 is coupled to line 210, and is used to provide the attenuation factor A used by the attenuator 201. As illustrated, the components 202-204 include respective configuration registers 212, 213, 214. Of course in some implementations, a single register can store parameters for all the components. In some embodiments, configuration can include bypassing the redundancy remover 202.

A redundancy remover 202 can be configured for example to compute first-order, second-order or higher-order derivatives during the compression operation using the configuration register. The redundancy remover 202 may be configured to calculate the derivatives among consecutive samples or samples separated by a fixed interval, as indicated by the configuration register. The bit packer 203 can be configured to match the characteristics of the redundancy remover, and for the purposes of adapting the data structure to particular system implementations. The attenuation control logic 204 can be configured using a configuration register 214 for lossless compression where the attenuation factor is set to "1", or for lossy compression where a controlled output bit rate is desired. For lossy compression for example, the number of bits per packet (or other sequence) of output from the bit packer 203 can be counted. The attenuation factor A can be adjusted to maintain a constant bit rate by adjusting the attenuation of the incoming data. In yet another mode, the attenuation control logic 204 can be configured for a fixed attenuation value less than "1".

Figure 9:
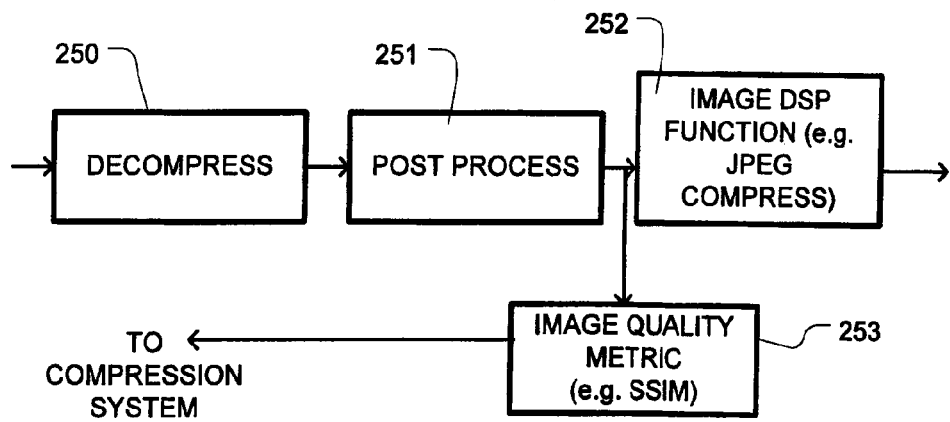
FIG. 9 is a block diagram showing components of a system for decompressing captured compressed raw images, and applying further digital signal processing functions to the decompressed images.

FIG. 9 illustrates the basic components for decompression logic complementary to the compression logic described the above. The compression logic includes a decompress block 250, which receives the data structures of the compressed raw format image and applies the parameters read from those data structures to produce recovered raw image data. The output of the decompress block 250 is applied to a postprocessing block 251, when necessary, in order to configure the recovered raw image data in a format for use by the host processor. For example, for raw image data in which separate compression algorithms have been applied to each component, the postprocessor 251 reassembles the triplets or quads of the original raw image data. The raw image data are then applied to image DSP function or other image processing as represented by block 252, which can be executed off-line. The output of the further processing can be applied as desired by the system, for example for storage in nonvolatile memory or for transmission via a network to other systems.

In the example shown in FIG. 9, an image quality metric block 253 is provided. The image quality metric block 253 can compute, using the resources of the host processor for example, information about the quality of the recovered raw image data, such as so-called structural similarity SSIM index data. The information gathered can be returned to the compression system for adjustment of the configuration parameters, or provided to the user for analytic purposes.

Figure 10:
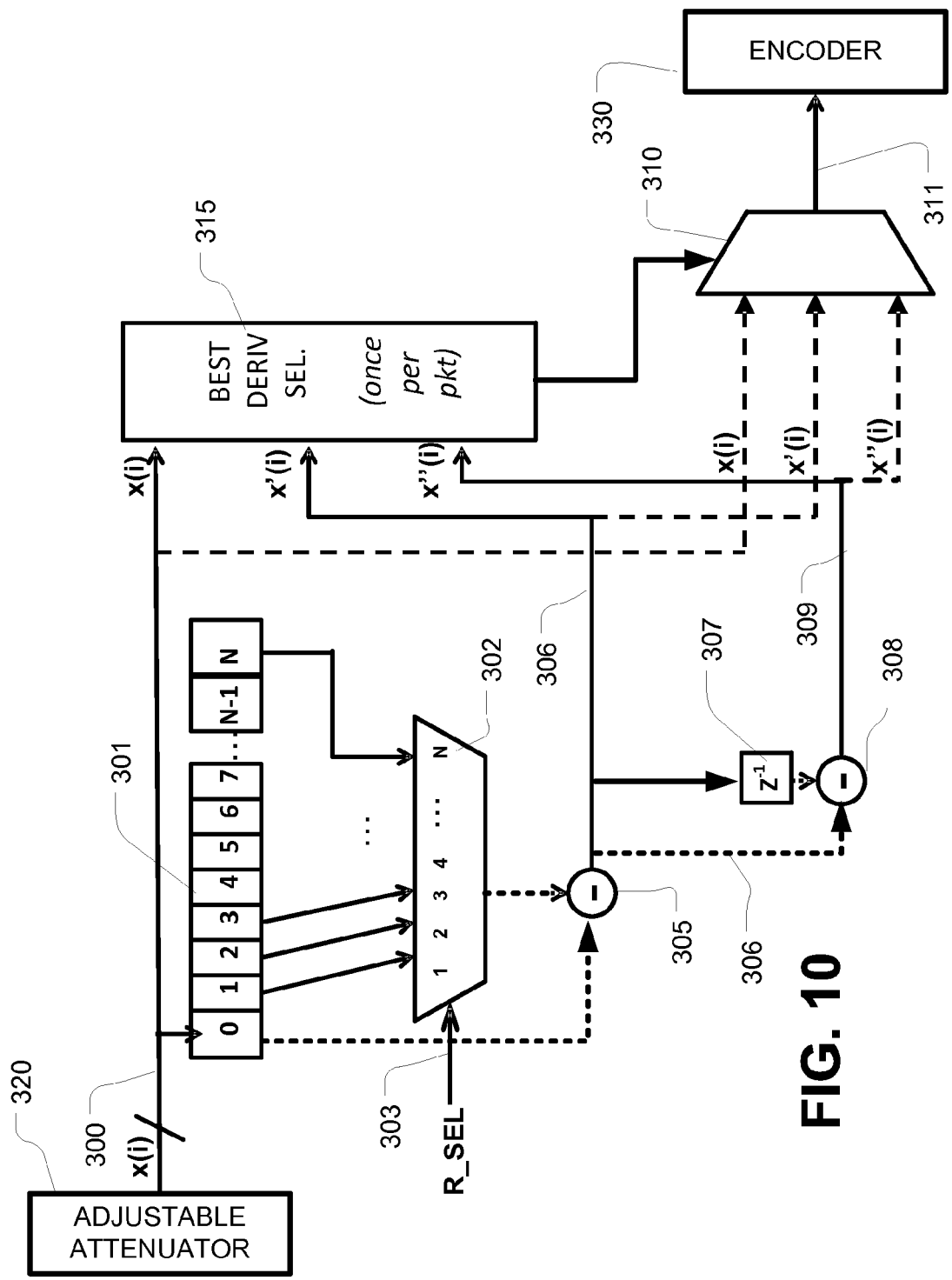
FIG. 10 is a diagram of redundancy remover logic suitable for use in image capture systems as described herein.

FIG. 10 illustrates a redundancy remover that can be used for real-time compression as described herein, which includes dynamic configuration as well as user-defined configuration. The logic described with reference to FIG. 10 can provide lossless compression at least as fast at the image data rate for large formal digital color images, while usually providing at least 2 to 1 compression. In this example, the input samples x(i), optionally after passing through a configurable attenuator 320, are delivered on line 300, where they are input to a FIFO buffer 301. The depth of FIFO buffer 301 in stages, determined by the number of storage slots for pixel data is equal to the length of a row in the two-dimensional image being input, plus 1 (storage slots 0 to N, for a row N pixels long), to store a sample from the previous row. The FIFO buffer 301 may contain enough storage for all multiplexed color components, and thus include a separate register for each component at each storage slot. For example, for RGB color components, the FIFO buffer 301 may include a sequence of components $R_1G_1B_1$ in slot 1, $R_2G_2B_2$ in slot 2, etc., plus 3 storage locations at slot N for RGB samples of the first pixel of the previous row. For another example, when raw image data are constructed of Bayer matrix components, as illustrated in FIG. 6, there are odd rows of alternating red and green components, and even rows of alternating green and blue components. The FIFO buffer 301 may be configured as two buffers, one to store the even rows of red and green components, and one for the odd rows of green and blue components, each buffer having two additional storage locations for the previous even row for RG components, or the previous odd row for GB components. Alternatively, the FIFO buffer 301 may be configured to accommodate both the odd and even rows (including the two additional storage locations for each row), with the odd row data stored in the first half and the even row data stored in the second half. FIG. 10 illustrates one sample per pixel, for simplicity.

Thus, FIFO buffer 301 stores the samples from pixel 0 to pixel N−1 of a current row. The sample stored at stage N is from the previous row and its position in the row corresponds to that of the sample stored at stage 0 for the current row. At least one stage of the FIFO buffer 301 is coupled to multiplexer 302. In the illustrated embodiment, stages 1, 2, 3, and N are coupled to the multiplexer 302. The multiplexers are controlled by a redundancy selection parameter "R_SEL" on line 303, which can be provided by a configuration register or otherwise programmed by a user. The output of the multiplexer 302 is delivered to the differencing circuit 305 (or one differencing circuit for each classification of sample), and used for computing a first-order derivative, by subtracting the output of the multiplexer 302 from the current sample delivered from the sample from stage 0 of the FIFO buffer 301. The output of the differencing circuit 305 is provided on line 306 as a first derivative sample x'(i). Line 306 is coupled to register 307 and used for computing a second-order derivative using the differencing circuit 308. The differencing circuit 308 takes a difference between the sample on line 306 and the sample in register 307 to provide a second order derivative sample x"(i) on line 309. Lines 300, 306 and 309 are provided as inputs to a multiplexer 310 which selects one of the channels as output on line 311 to the encoder 330, such as a block floating point bit packer. The multiplexer 310 is responsive to a "best derivative selector" in block 315. The best derivative selector 315 determines the bit sequence that has the fewest bits, and decides once per packet whether to use the input bitstream x(i), the first derivative x'(i) or the second derivative x"(i) as the compressed raw format image output for the next packet.

The redundancy remover shown in FIG. 10 is configurable to operate in a one-dimensional compression mode, where the redundancy selector causes selection of the first stage 1 of the FIFO buffer 301 for use by the differencing circuit 305. In this mode, the difference between adjacent pixels in a single row is used in the compression process. The redundancy remover is also configurable to operate in a two-dimensional compression mode, with a redundancy selection parameter on line 303 which causes selection of the last stage N of the FIFO buffer 301 for use by the differencing circuit 305. In this mode, the difference between corresponding pixels on adjacent rows is used in the compression process. For raw format image that may have some periodicity along the rows, or otherwise have characteristics of a modulated bitstream, the redundancy selection parameter on line 303 can be set to apply other stages of the FIFO buffer 301 for use in the differencing operation.

In other embodiments, three-dimensional compression can be applied. In such embodiments, the system can include both a FIFO buffer 301 and a frame buffer, or only a frame buffer, enabling frame-to-frame differencing operations.

Figure 11:
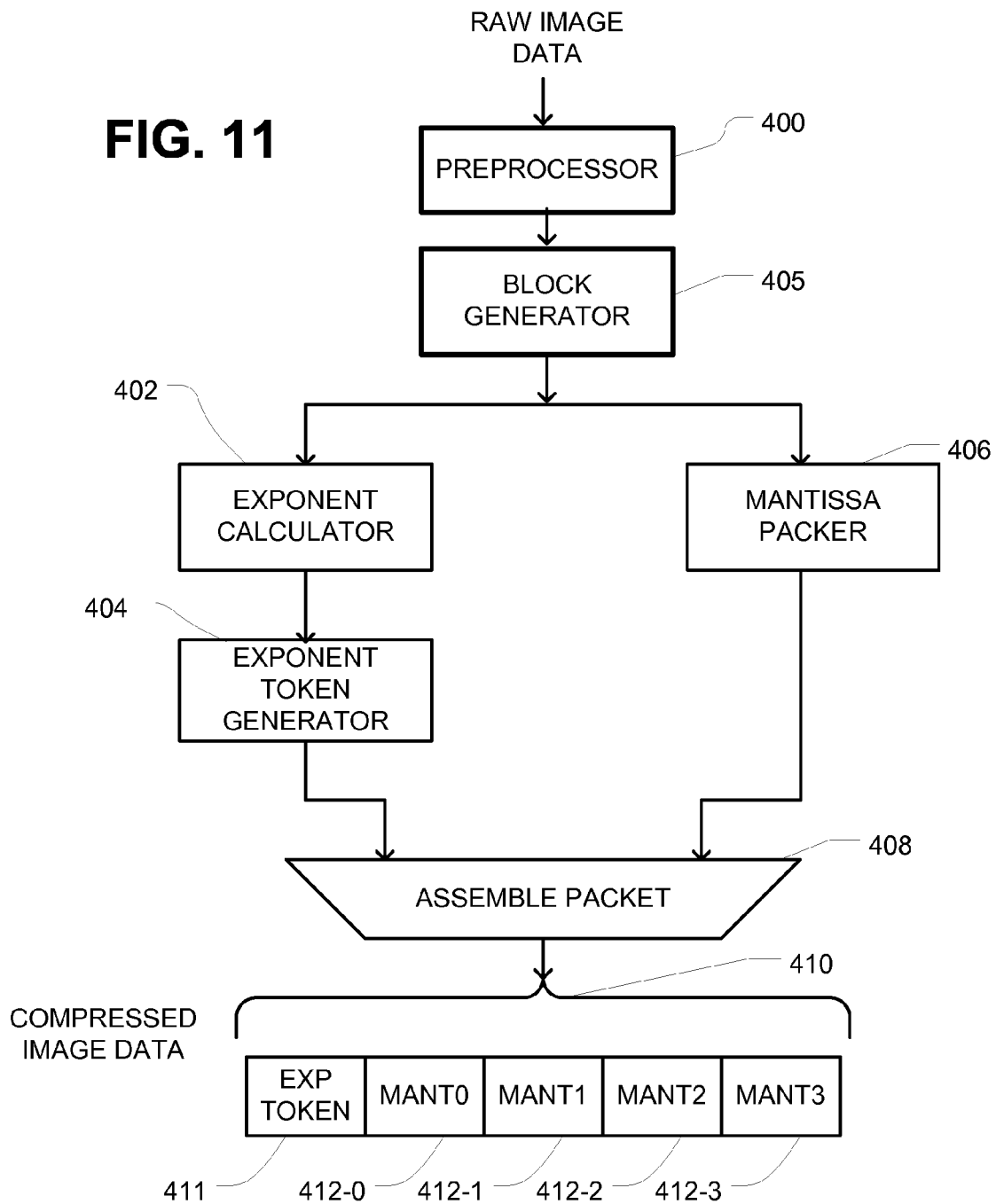
FIG. 11 is a block diagram of the block floating point encoder applied for image compression as described herein.

FIG. 11 is a block diagram of an embodiment of an in-line image compression logic applying block floating point encoding and bit packing, as described in my copending U.S. patent application Ser. No. 12/605,245, filed 23 Oct. 2009 entitled BLOCK FLOATING POINT COMPRESSION OF SIGNAL DATA (now Pub. No.: US 2011/0099295 A1), which is incorporated by reference as if fully set forth herein. The system in this example includes a preprocessor 400, which can perform one or more of the functions of sample classification, sample attenuation, redundancy removal and so on. For example, the preprocessor 400 may include the redundancy remover 52 (FIG. 3) or redundancy remover 202 (FIG. 8) to provide the derivative samples to the block generator 405. For another example, the preprocessor 400 may include demultiplexer 151 (FIG. 5) or demultiplexer 161 (FIG. 7) to classify the color components and provide the color components to the block generator 405. If there is more than one classification of image data samples, then one block generator can be provided for each classification, along with the logic blocks 402-408 described below, for each classification. The block generator 405 defines blocks of N_GROUP samples (N_GROUP is a number of samples) to be encoded together. For a multispectral coding, one could assign blocks that include N_GROUP samples per color plane.

For the N_GROUP samples, the maximum exponent to be used for the group is encoded and the N_GROUP mantissas are encoded according to the following steps.

For the first group of N_GROUP samples:
1) Determine the exponent (base 2) for the sample with the maximum magnitude, such as by calculating the log 2 of the maximum magnitude in each group of N_GROUP samples. This indicates the number of bits per encoded sample, or $n\_exp(0)$.
2) Absolute encode the exponent $n\_exp(0)$ of the first group using S bits, where S is the original number of bits per sample.
3) Encode the N_GROUP samples using $n\_exp(0)$ bits per sample.

For the ith group (i>0) of N_GROUP samples:
4) Determine the $i^{th}$ exponent (base 2) for the sample with the maximum magnitude, which indicates the number of bits per encoded sample in the $i^{th}$ group, or $n\_exp(i)$;
5) Differentially encode the $i^{th}$ exponent by subtracting $n\_exp(i)$ from $n\_exp(i-1)$ to determine an $i^{th}$ difference value. Encode the $i^{th}$ difference value using a corresponding token, where shorter tokens represent more common difference values and longer tokens represent less common difference values.
6) Encode the $i^{th}$ group of N_GROUP samples using $n\_exp(i)$ bits per sample.

For the first group of samples, the exponent $n\_exp(0)$ is directly encoded. For example, the exponent $n\_exp(0)$ can be encoded as follows, where S is the original number of bits per sample:

| a. | 0: | $n\_exp(0) = 0$ (all 4 sample values are zero) |
|---|---|---|
| b. | 1: | $n\_exp(0) = 2$ (2 bits per sample) |
| c. | 2: | $n\_exp(0) = 3$ (3 bits per sample) |
| d. | etc. until S − 1: | $n\_exp(0) = S$ (S bits per sample) |

For the ith group, the exponent $n\_exp(i)$ may be differentially encoded using a prefix code, where no codeword is the prefix of another codeword. An example of differential encoding is as follows:
1. Calculate difference: $e\_diff = n\_exp(i) - n\_exp(i-1)$
2. Encode e_diff as follows:

| a. | 0: | $e\_diff = e(i) - e(i-1)$ |
|---|---|---|
| b. | 101: | $e\_diff = +1$ |
| c. | 110: | $e\_diff = -1$ |
| d. | 1001: | $e\_diff = +2$ |
| e. | 1110: | $e\_diff = -2$ |
| f. | Etc. | |

Huffman encoding of the exponent differences assigns tokens of different lengths to the exponent differences based on their frequencies of occurrence. Shorter Huffman tokens may be assigned to the more frequent values of exponent differences. The exponents $n\_exp(i)$ may be directly encoded, for example by Huffman encoding, instead of differentially encoded. Alternatives for encoding the block exponents are described in the copending U.S. patent application Ser. No. 12/605,245.

Figure 12A:
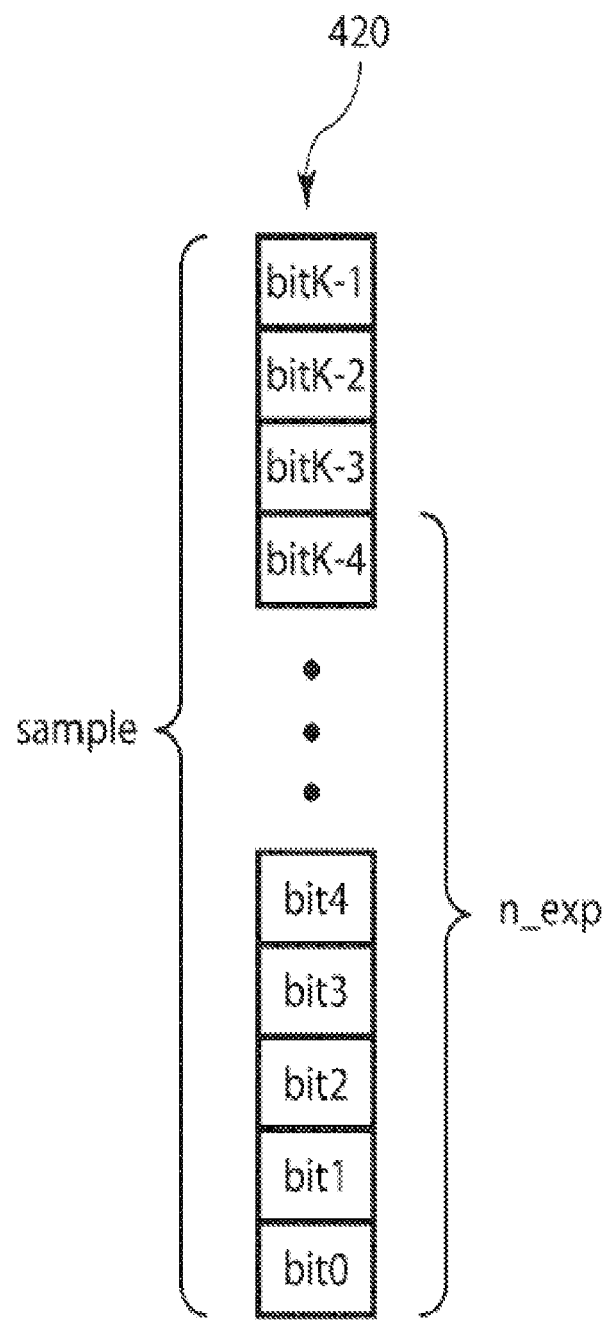
FIG. 12*a* illustrates an example of selecting n_exp bits for the encoded mantissa.
Figure 12B:
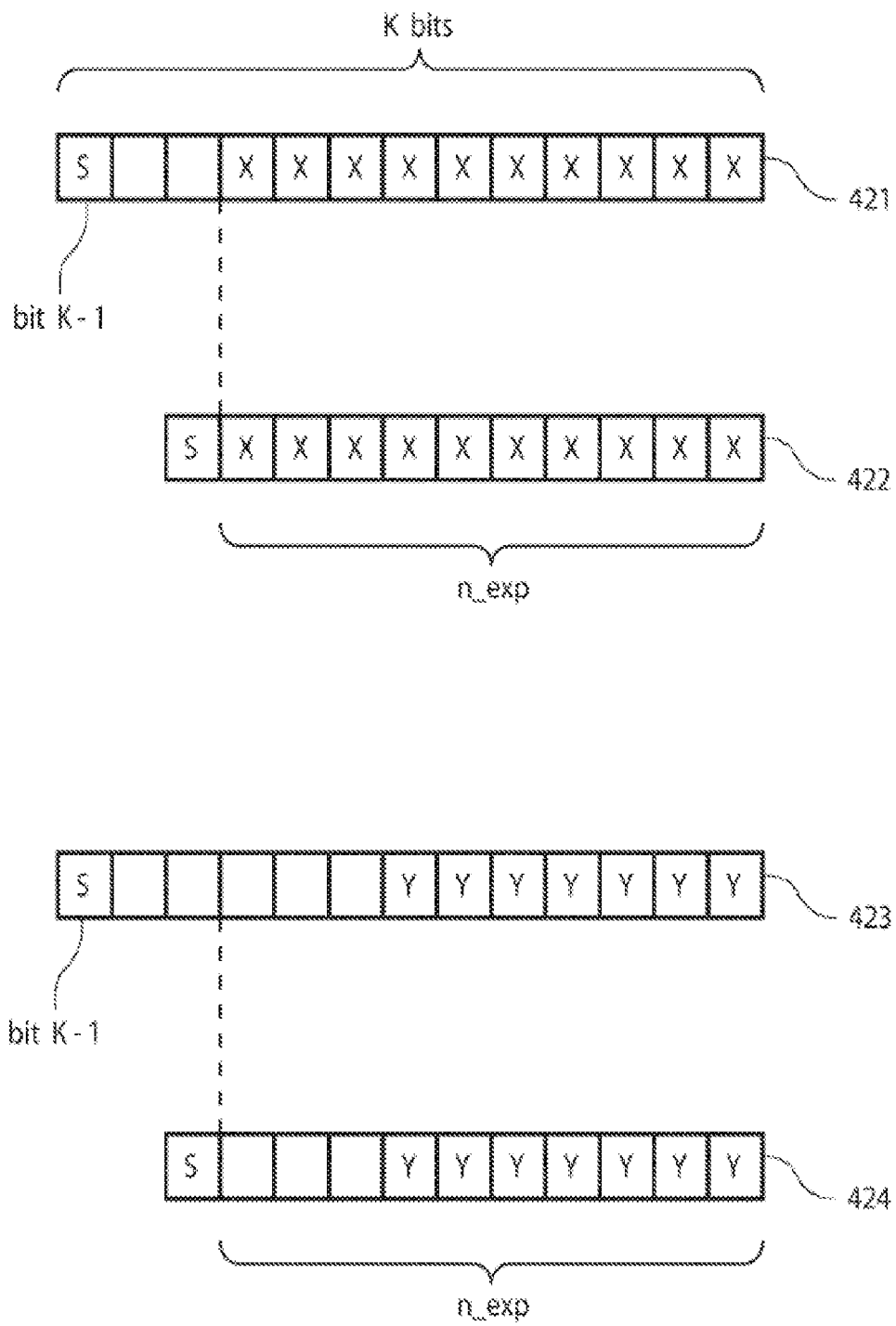
FIG. 12*b* shows an example of compressing two samples within the same block.

FIG. 11 is an example of the block floating point encoder where N_GROUP=4 samples. The exponent calculator 402 determines the maximum exponent, n_exp, for the N_GROUP samples as in step 1 and step 4. The maximum exponent corresponds to the log base 2 of the sample with the maximum magnitude. The exponent token generator 404 encodes the n_exp values as in step 2 and step 5. The mantissa packer 406 encodes the mantissas for the N_GROUP samples as in step 3 and step 6, producing mantissas having n_exp bits. FIG. 12a illustrates an example of selecting n_exp bits for the encoded mantissa. The input sample 420 is represented by K bits. The n_exp lower bits of the sample 420 are selected for encoding. The sign bit for the sample is appended to the selected bits and the resulting sequence of bits represents the encoded sample. FIG. 12b shows an example of compressing two samples within the same block. For this example, the samples are represented in a sign-magnitude format. The maximum magnitude sample 421 of the N_GROUP samples in the block occupies n_exp mantissa bits, indicated by "X". The original number of bits per sample is K, indexed from 0 to K−1 with bit K−1 representing the sign bit "S". The compressed sample 422 represents the n_exp mantissa bits "X", in accordance with steps 3 and 6, along with the sign bit "S". Sample 423 represents another sample in the block of N_GROUP samples occupying the bits indicated by "Y". The compressed sample 424 uses n_exp bits to represent the mantissa bits "Y", in accordance with steps 3 and 6, along with its sign bit "S". The mantissas of the compressed samples 422 and 424 have the same integer values as the corresponding mantissas of the uncompressed samples 421 and 423, however the bit width of each mantissa is reduced. Returning to FIG. 11, the multiplexer 408 assembles the encoded exponent token 411 followed by the set of N_GROUP encoded mantissas along with the sign bits to form the compressed group 410 representing the N_GROUP compressed samples. For this example, the compressed group 410 includes the exponent token 411 followed by the sequence of four packed mantissas (with appended sign bits) 412-0, 412-1, 412-2 and 412-3. Bit packer logic may be included in the block 408, and concatenate consecutive compressed groups 410 to form the data portion of a compressed packet. Alternatively, the bit packer may arrange a sequence of exponent tokens corresponding to a sequence of groups followed by the corresponding sets of mantissas. The preferred sizes for N_GROUP are three or four samples per group. However, variable group sizes may also be used.

Encoding the mantissas and exponents separately can provide additional compression and mitigate compression error. In a some embodiments for exponent encoding, two or more exponent difference values are jointly encoded. A statistical analysis of block exponent values for signal data from various applications, including ultrasound, radar and computed tomography raw data showed that 90% of consecutive exponents have differences in the range of $\{-1, 0, +1\}$ and that 98% of consecutive exponents have differences in the range $\{-2, -1, 0, +1, \text{and} +2\}$. Jointly encoding two or more successive exponent differences can reduce the number of bits per encoded exponent. An encoding scheme that uses four or eight bits for an exponent token is given in FIG. 13. By using a fixed number of exponent bits, the complexity of both the compressor and decompressor are reduced, when compared to exponent encodings that permit exponent encodings having arbitrary bit lengths. FIG. 13's table lists exponent token values for three encoding options: (A) jointly encoding two successive exponent differences, (B) encoding one exponent difference and (C) absolute (or linear) encoding of one exponent value. The successive exponent differences $\{\text{diff}(i), \text{diff}(i-1)\}$ for the joint encoding option (A), given in the third column, have nine different combinations of difference values, in which both the first and the second encoded exponent difference have one of three possible values $\{-1, 0, +1\}$. These nine of sixteen combinations in the table may be encoded using exponent tokens having 4 bits each. Since one token encodes the exponents for two blocks, the joint encoding of exponent differences uses 2 bits per block exponent. Encoding of a single exponent difference in the range $\{-2, -1, 0, +1, +2\}$ and the associated exponent tokens are listed for option (B). This option uses five of the sixteen combinations in the table. Finally, absolute encoding for the exponent value itself, n_exp(i), listed for option (C), uses 8 bits per exponent token. In this embodiment, the top three bits are set to 1's and the bottom five bits encode the exponent. The top three bits set to 1's indicate that the exponent is absolute encoded. The five lower bits indicate one absolute exponent in the range $\{0, 2, 3, \ldots, 32\}$, where an exponent value of 1 is not allowed. Using an integer number of nibbles (4-bit units) simplifies exponent encoding and later decoding. Applying the exponent encoding of FIG. 13 to the signal data from the above applications showed the following proportions for the exponent encoding options:

(A) joint encoding option (2 bits/exponent)—80% of the exponents (B) differential encoding option (4 bits/exponent)—18% of the exponents (C) linear encoding option (8 bits/exponent)—2% of the exponents The weighted average of the bits/exponent for each of the options indicates that the average number of bits per encoded exponent is about 2.48 bits. Since there are N_GROUP individual samples per encoded exponent, the exponent encoding scheme provides substantial efficiency when compared to alternative exponent encoding techniques, especially those using one exponent per mantissa.

For efficient encoding and decoding of packets, the compressed data for all the samples represented by the packet are contained within the packet. Absolute encoding the first block exponent of the packet makes the first exponent token independent of the previous packet. The final block exponent of the packet may be differentially encoded with the next-to-last block exponent of the packet. The exponent difference corresponding to the last block exponent and the previous block exponent may be jointly encoded with the previous exponent difference within the same packet, but may not be jointly encoded with the first exponent difference of the subsequent packet.

FIG. 14 is a simplified flowchart for an image capture process that includes in-line raw format image compression. According to the simplified flowchart, an image capture device captures an image and outputs image data in a raw format at an image capture rate (1001). The raw format image data are pre-processed, such as by classifying components into separate streams (1002). Next, separate components of the raw image data samples are attenuated by an attenuation factor "A" (1003). There can be separate attenuation factors for each component stream in some embodiments. The attenuated raw image data are applied to a redundancy remover, where redundancy can be removed, such as using different algorithms like described above (1004). Next, the data are encoded and assembled into packets of compressed data for transfer or storage (1005). In the process illustrated, the compressed raw format image file is transferred on a data channel within a time window less than or equal to an image capture time window, where the data transfer rate can be slower than the image capture data rate to a receiving device (1006). The receiving device receives and stores the compressed raw format image within a time window less than or equal to an image capture time window (1007).

The steps 1001 to 1007 occur in-line, that is while a raw format image is being transferred out of the sensors and digitally sampled, in a manner to keep up with the image capture process. After the compressed raw format image has been stored, it can be held for later off-line processing. Thus, in this example flow, at a later time, the compressed raw format image data are read and decompressed to form recovered raw image data (1008). In embodiments in which the color space components are classified and compressed in separate streams, the pixel values are reassembled into the expected raw image format. The raw image data recovered in this manner can be processed by applying digital signal processing algorithms (1009). For example, a digital signal processing algorithm can be applied to a recovered raw format image to convert it into industry-standard formats such as JPEG and H.264, or perform other transform domain compression techniques such as the wavelet transform process described in U.S. Pat. No. 7,372,485, by Bodnar et al.

FIG. 14 therefore illustrates an embodiment of an image capture process that includes first in-line compression of raw image data, and second off-line decompression to provide recovered raw image data followed by further processing of the recovered raw image data off-line.

The compression process illustrated in FIG. 14 can also be implemented in a manner to use feedback of compression performance data to control the compression process (1011).

Thus, for example, packets assembled at block 1005 can be processed to identify compression efficiency, such as by counting the number of bits per packet or other sequence. This information about compression efficiency can be applied in the process for use in pre-processing or for use in controlling the attenuation factor "A." Compression efficiency feedback can be applied in-line, in some embodiments.

Also, after recovering the image data from the compressed raw format image, quality assessments can be executed to provide feedback about compression performance. In response to quality assessments, the compression algorithm can be changed by, for example, altering the preprocessing sequence, changing the attenuation factor A, or changing the redundancy removal algorithm.

The logic shown in FIG. 10, optionally including additional components such attenuation control logic with configuration registers and options, as described above, can be implemented using FPGA circuits. For implementation using FPGA circuits, the technology described here can include a memory storing a machine readable specification of the compression logic, and a machine readable specification of the decompression logic, in the form of a configuration file for the FPGA block. The circuit shown in FIG. 10, optionally including additional components such as attenuation control logic as described above, and decompression logic as well, may be described using computer aided design tools and expressed (or represented), as data and/or instructions embodied in various computer-readable media, in terms of their behavioral, register transfer, logic component, transistor, layout geometry, and/or other characteristics. A machine readable specification of the compression logic, and a machine readable specification of the decompression logic can be implemented in the form of such behavioral, register transfer, logic component, transistor, layout geometry and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. A memory including computer-readable media in which such formatted data and/or instructions may be embodied include, but are not limited to, computer storage media in various forms (e.g., optical, magnetic or semiconductor storage media, whether independently distributed in that manner, or stored "in situ" in an operating system).

When received within a computer system via one or more computer-readable media, such data and/or instruction-based expressions of the above described circuits may be processed by a processing entity (e.g., one or more processors) within the computer system in conjunction with execution of one or more other computer programs including, without limitation, netlist generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

While the preferred embodiments of the invention have been illustrated and described, it will be clear that the invention is not limited to these embodiments only. Numerous modifications, changes, variations, substitutions and equivalents will be apparent to those skilled in the art, without departing from the spirit and scope of the invention, as described in the claims.

I claim:

1. A method, comprising:
receiving a raw format image from an image capture device within an image capture time window, the raw format image including a plurality of pixel samples representing an image;
compressing the raw format image using only a time domain compression process to form a compressed raw format image during a time interval that is less than or equal to the image capture time window;
transferring the compressed raw format image across a data channel to a receiving device within a transfer window having a time duration less than or equal to the image capture time window;
decompressing the compressed raw format image after said transferring to form a recovered raw format image; and
applying digital signal processing to the recovered raw format image.

2. The method of claim 1, wherein the receiving device is an integrated circuit, and including transferring the compressed raw format image from the receiving device to a memory before said decompressing, and reading the compressed raw format image from the memory for decompressing, and wherein the decompressing is executed on the receiving device.

3. The method of claim 1, wherein the receiving device is a memory, and including reading the compressed raw format image from the memory before said decompressing.

4. The method of claim 1, wherein the digital signal processing includes transform domain image compression of the recovered raw format image.

5. The method of claim 1, including applying one or more compression control parameters to said compressing, the compression control parameters being based on one or more characteristics of the compressed raw format image.

6. The method of claim 1, including applying one or more compression control parameters to said compressing, the compression control parameters being based on one or more characteristics of the recovered raw format image.

7. The method of claim 1, wherein the raw format image comprises RGB encoded data.

8. The method of claim 1, wherein the raw format image comprises YUV encoded data.

9. The method of claim 1, wherein the raw format image comprises Bayer matrix mosaic data.

10. The method of claim 1, wherein the raw format image comprises mosaiced encoded data wherein the digital signal processing includes de-mosaicing and image compression.

11. The method of claim 1, including said compressing the plurality of pixel samples at a first integrated circuit, and wherein the receiving device is a second integrated circuit, storing the compressed raw format image in memory on the second integrated circuit.

12. The method of claim 1, including compressing the plurality of pixel samples at a first integrated circuit, and wherein the receiving device is a second integrated circuit, and including transferring the compressed raw format image from the receiving device to a third integrated circuit including memory before said decompressing, and reading the compressed raw format image from the third integrated circuit for decompressing, and wherein the decompressing is executed by a processor or processors on the receiving device.

13. The method of claim 1, including providing compression logic including a plurality of compression modes, identifying a particular compression mode of the plurality of compression modes, and wherein said compressing includes applying the particular compression mode.

14. The method of claim 13, wherein the plurality of compression modes includes at least one lossless compression mode and at least one lossy compression mode.

15. The method of claim 13, wherein the plurality of compression modes includes at least one one-dimensional compression mode and at least one two-dimensional compression mode.

16. The method of claim 13, wherein the plurality of compression modes includes at least one one-dimensional compression mode and at least one three-dimensional compression mode.

17. The method of claim 1, wherein the raw format image comprises a plurality of color space components, and the plurality of pixel samples comprises values of the color space components, and wherein said compressing includes classifying the pixel samples into sub-streams of color space components, and applying compression processes to the sub-streams.

18. The method of claim 17, including applying different attenuation factors to the sub-streams.

19. The method of claim 1, wherein said compressing the raw format image is performed using block floating point compression.

20. A method, comprising:
generating a raw format image in a first integrated circuit including an image capture device within an image capture time window, the raw format image including a plurality of pixel samples representing an image;
compressing the raw format image to form a compressed raw format image during a time interval that is less than or equal to the image capture time window, wherein said compressing the raw format image is performed using only time domain compression logic;
transferring the compressed raw format image across a serial data channel or serial data channels, to a second integrated circuit within a transfer window having a time duration less than or equal to the image capture time window;
decompressing the compressed raw format image at the second integrated circuit after said transferring to form a recovered raw format image; and
applying digital signal processing at the second integrated circuit to the recovered raw format image.

21. A method, comprising:
receiving a raw format image from an image capture device within an image capture time window at an image data rate, the raw format image including a plurality of pixel samples representing multispectral coding;
compressing the raw format image using a time domain compression process to form a compressed raw format image during a time interval that is less than or equal to the image capture time window, wherein said compressing the raw format image is performed using only time main compression logic; and
transferring the compressed raw format image across a data channel to a receiving device, wherein a data transfer rate of the data channel is less than the image data rate, wherein the multispectral coding of the raw format image comprises a plurality of color space components, and the plurality of pixel samples comprises values of the color space components, and wherein said compressing includes classifying the pixel samples into sub-streams of color space components, and applying compression processes to the sub-streams.

22. The method of claim 21, including applying different attenuation factors to the sub-streams.

23. The method of claim 21, wherein said compressing the raw format image is performed using block floating point compression.

24. An apparatus, comprising:
an image capture device including, or adapted to be coupled to, an image sensor, the image capture device configured to produce a raw format image within an image capture time window, the raw format image including a plurality of pixel samples representing an image sensed during the image capture time window, the image capture device including compression logic to compress the raw format image using only a time domain compression process to form a compressed raw format image within a first time interval having a duration equal to or less than the image capture time window, and a data transfer interface to transfer the compressed raw format image across a data channel to a receiving device within a second time interval having a duration equal to or less than the image capture time window; and
the receiving device including memory having a capacity sufficient to store the compressed raw format image, logic to access the compressed raw format image in the memory and to decompress the compressed raw format image to form a recovered raw format image, and logic to apply digital signal processing to the recovered raw format image.

25. The apparatus of claim 24, wherein the receiving device includes an integrated circuit including logic to execute the decompressing and logic to transfer the compressed raw format image to or from the memory before said decompressing.

26. The apparatus of claim 25, wherein the integrated circuit includes a processor configured to apply the digital signal processing.

27. The apparatus of claim 24, wherein the digital signal processing includes transform domain image compression of the recovered raw format image.

28. The apparatus of claim 24, wherein the compression logic is responsive to one or more compression control parameters based on one or more characteristics of the compressed raw format image.

29. The apparatus of claim 24, wherein the compression logic is responsive to one or more compression control parameters based on one or more characteristics of the recovered raw format image.

30. The apparatus of claim 24, wherein the raw format image comprises RGB encoded data.

31. The apparatus of claim 24, wherein the raw format image comprises YUV encoded data.

32. The apparatus of claim 24, wherein the raw format image comprises Bayer Matrix mosaic data.

33. The apparatus of claim 24, wherein the raw format image comprises mosaic encoded data wherein the digital signal processing includes de-mosaicing and image compression.

34. The apparatus of claim 24, wherein the image capture device is a component of a first integrated circuit, and the receiving device comprises a second integrated circuit coupled to the data channel in communication with the first integrated circuit.

35. The apparatus of claim 24, wherein the receiving device includes a first integrated circuit coupled to the data channel and a second integrated circuit including said memory.

36. The apparatus of claim 24, wherein the compression logic applies a plurality of compression modes, the compression logic being responsive to configuration parameters to identify a particular compression mode of the plurality of compression modes.

37. The apparatus of claim 36, wherein the plurality of compression modes includes at least one lossless compression mode and at least one lossy compression mode.

38. The apparatus of claim 36, wherein the plurality of compression modes includes at least one one-dimensional compression mode and at least one two-dimensional compression mode.

39. The apparatus of claim 36, wherein the plurality of compression modes includes at least one one-dimensional compression mode and at least one three-dimensional compression mode.

40. The apparatus of claim 24, wherein the raw format image comprises a plurality of color space components, and the plurality of pixel samples comprises values of the color space components, and wherein the compression logic includes logic to classify the pixel samples into sub-streams of common color space components and to apply compression processes to the sub-streams.

41. The apparatus of claim 40, wherein the compression logic includes circuitry to apply different attenuation factors to the sub-streams.

42. The apparatus of claim 24, wherein the compression logic applies block floating point compression.

43. An apparatus, comprising:
an image capture device configured to produce a raw format image at an image data rate within an image capture time window, the raw format image including a plurality of pixel samples representing multispectral coding, the image capture device including compression logic to compress the raw format image to form a compressed raw format image at least as fast as the image data rate and a data transfer interface to transfer the compressed raw format image across a data channel to a receiving device within a time window equal to or less than the image capture time window; and
wherein the multispectral coding of the raw format image comprises a plurality of color space parameters, and the plurality of pixel samples comprises values of the color space parameters, and wherein the compression logic includes logic to classify the pixel samples into sub-streams of common color space parameters and to apply only time domain compression processes to the sub-streams.

44. The apparatus of claim 43, wherein the compression logic includes circuitry to apply different attenuation factors to the sub-streams.

45. The apparatus of claim 43, wherein the compression logic applies block floating point compression.

46. An apparatus, comprising:
an image capture device including, or adapted to be coupled to, an image sensor, the image capture device configured to produce a raw format image within an image capture time window, the raw format image including a plurality of pixel samples representing an image sensed during the image capture time window, the image capture device including compression logic to compress the raw format image using only time domain compression to form a compressed raw format image within a first time interval having a duration equal to or less than the image capture time window, and a data transfer interface to transfer the compressed raw format image across a data channel to a receiving device within a second time interval having a duration equal to or less than the image capture time window.

47. The apparatus of claim 46, wherein the compression logic applies block floating point compression.

48. A memory storing a machine readable specification of a compression block for compressing a raw format image captured at an image data rate, the raw format image including a plurality of pixel samples representing multispectral coding, the compression block comprising:
compression logic to compress the raw format image only with a time domain compression process, to form a compressed raw format image at least as fast as the image data rate, wherein the multispectral coding of the raw format image comprises a plurality of color space components, and the plurality of pixel samples comprises values of the color space components, and wherein said compressed raw format image includes sub-streams of image samples for separate color space components.

49. The memory of claim 48, wherein the compressed raw format image is compressed using block floating point compression.

* * * * *